(12) United States Patent
Hu et al.

(10) Patent No.: US 10,536,243 B2
(45) Date of Patent: Jan. 14, 2020

(54) METHOD AND APPARATUS FOR COORDINATING RESOURCES

(71) Applicants: Telefonaktiebolaget LM Ericsson (publ), Stockholm (SE); Yang Hu, Beijing (CN)

(72) Inventors: Yang Hu, Beijing (CN); Angelo Centonza, Winchester (GB); Yipeng Zhang, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 90 days.

(21) Appl. No.: 15/503,975

(22) PCT Filed: Aug. 20, 2014

(86) PCT No.: PCT/CN2014/084838
§ 371 (c)(1),
(2) Date: Feb. 14, 2017

(87) PCT Pub. No.: WO2016/026109
PCT Pub. Date: Feb. 25, 2016

(65) Prior Publication Data
US 2017/0222774 A1    Aug. 3, 2017

(51) Int. Cl.
*H04L 5/00* (2006.01)
*H04W 72/04* (2009.01)
(Continued)

(52) U.S. Cl.
CPC .......... *H04L 5/0035* (2013.01); *H04L 5/0037* (2013.01); *H04W 16/06* (2013.01);
(Continued)

(58) Field of Classification Search
CPC . H04W 88/04; H04W 36/0072; H04W 48/12; H04W 52/0209; H04W 52/0229;
(Continued)

(56) References Cited

U.S. PATENT DOCUMENTS 9,693,262 B2 *  6/2017  Gunnarsson .......... H04W 24/02
2012/0034918 A1 *  2/2012  Park ...................... H04W 60/06
                                                                            455/435.1
(Continued)

FOREIGN PATENT DOCUMENTS

CN          102461300 A      5/2012
CN          103039028 A      4/2013
(Continued)

OTHER PUBLICATIONS

Extended European Search Report for Application No./Patent No. 14900203.2-1215 / 3183929 PCT/CN2014084838—dated Mar. 15, 2018.
(Continued)

*Primary Examiner* — Yemane Mesfin
*Assistant Examiner* — Mon Cheri S Davenport
(74) *Attorney, Agent, or Firm* — Baker Botts, LLP

(57) ABSTRACT

Embodiments of the present disclosure provide a method in a base station for coordinating resources in a wireless communications system with carrier aggregation in which a first group of terminal devices is served by a primary cell and one or more secondary cells under control of the base station. The method comprises obtaining information indicating arrival of a second group of terminal devices at coverage of the base station. A speed of any terminal device of the second group is higher than a speed of any terminal device of the first group. The method also comprises releasing resources on at least one secondary cell of the one or
(Continued)

more secondary cells and allocating the released resources to the second group of terminal devices.

15 Claims, 8 Drawing Sheets

(51) Int. Cl.
  *H04W 16/06* (2009.01)
  *H04W 28/26* (2009.01)
(52) U.S. Cl.
  CPC .......... *H04W 28/26* (2013.01); *H04W 72/04* (2013.01); *H04W 72/048* (2013.01); *H04W 72/0453* (2013.01); *H04L 5/001* (2013.01)
(58) Field of Classification Search
  CPC ..... H04W 76/11; H04W 76/27; H04W 76/28; H04W 88/08; H04W 60/06; H04W 68/00; Y02D 70/1226; Y02D 70/1242; Y02D 70/1244; Y02D 70/1262; Y02D 70/12; Y02D 70/24; Y02D 70/25; G06Q 30/0258
  See application file for complete search history.

(56) References Cited

U.S. PATENT DOCUMENTS

| | | | |
|---|---|---|---|
| 2012/0087257 A1 | 4/2012 | Larsson et al. | |
| 2012/0282942 A1 | 11/2012 | Uusitalo et al. | |
| 2012/0302240 A1 | 11/2012 | Tamaki et al. | |
| 2013/0188473 A1 | 7/2013 | Dinan | |
| 2013/0322325 A1 | 12/2013 | Hahn et al. | |
| 2013/0329708 A1* | 12/2013 | Dinan | H04W 56/0005 370/336 |
| 2014/0133367 A1 | 5/2014 | Chen et al. | |
| 2016/0373980 A1* | 12/2016 | Yu | H04W 36/0077 |

FOREIGN PATENT DOCUMENTS

| | | |
|---|---|---|
| CN | 103597875 | 2/2014 |
| WO | 93 00777 A1 | 1/1993 |
| WO | 2013 055430 A3 | 4/2013 |
| WO | 2013 119018 A1 | 8/2013 |
| WO | 2013 157362 A1 | 10/2013 |
| WO | 2014 005247 A1 | 1/2014 |
| WO | WO 2014 019740 | 2/2014 |
| WO | WO 2015 077933 | 6/2015 |

OTHER PUBLICATIONS

PCT Written Opinion of the International Searching Authority for International application No. PCT/CN2014/084838—dated May 25, 2015.
PCT International Search Report for International application No. PCT/CN2014/084838—dated May 25, 2015.
Office Action issued by The State Intellectual Property Office of the People's Republic of China for Application No. 2014800813062 (translated Search Report)—dated Aug. 27, 2019.

* cited by examiner

METHOD AND APPARATUS FOR COORDINATING RESOURCES

PRIORITY

This nonprovisional application is a U.S. National Stage Filing under 35 U.S.C. § 371 of International Patent Application Serial No. PCT/CN2014/084838 filed Aug. 20, 2014, and entitled "Method And Apparatus For Coordinating Resources."

TECHNICAL FIELD

Embodiments of the present disclosure generally relate to communications field, and more particularly to a method, apparatus, base station, and computer program for coordinating resources in a wireless communications system with carrier aggregation.

BACKGROUND

This section introduces aspects that may facilitate a better understanding of the present disclosure. Accordingly, the statements of this section are to be read in this light and are not to be understood as admissions about what is in the prior art or what is not in the prior art.

The concept of carrier aggregation (CA) was introduced in Third Generation Partnership Project (3GPP) Long Term Evolution (LTE) release 10 and now has been widely adopted by global operators.

Carrier aggregation refers to transmitting data on multiple carriers that are contiguously or separately located in a spectrum. In carrier aggregation, each aggregated carrier is referred to as a component carrier (CC). The component carrier may have a bandwidth of 1.4, 3, 5, 10, 15 or 20 MHz and a maximum of five component carriers may be aggregated, hence the maximum aggregated bandwidth may be 100 MHz.

A user equipment (UE) supporting carrier aggregation may be configured by a base station, e.g. an evolved Node B (eNodeB or eNB) in an LTE network, with a primary component carrier (PCC) and one or more secondary component carriers (SCCs). There is no definition of which carrier should be used as the PCC. The configuration of the PCC is UE specific and will be determined according to loads on various carriers as well as other relevant parameters. Therefore, different UEs may use different sets of component carriers with different component carriers being configured as the PCCs.

When carrier aggregation is used, there are a number of serving cells, one for each component carrier. The Radio Resource Control (RRC) connection is only handled by a primary serving cell (PCell) served by the PCC. The secondary component carriers serve secondary serving cells (SCells). The SCells may be configured/de-configured, added, removed or modified for the UE via RRC signaling, e.g. RRCConnectionReconfiguration, while the PCell is only changed with a handover procedure. In LTE technology, the terms "PCC" and "PCell" are usually used interchangeably and the terms "SCC" and "SCell" are also used interchangeably.

When a UE is configured with SCells, the configured SCells need to be activated before they can be scheduled for data transmission. The SCells may be activated/deactivated by a base station via Media Access Control (MAC) layer commands, while the PCell configured to the UE is always activated. The base station may activate and deactivate the SCell(s) by sending an Activation/Deactivation MAC control element as described in section 5.13 of 3GPP Technical Specification (TS) 36. 321, V11.5.0. Upon successful reception of the activation command, the UE may be ready to receive assignments on the SCells with a certain time, e.g. 8$ms$ after the activation command was transmitted over the air. So the activation and de-activation procedure may be very fast and controlled totally by the base station.

With the emergence of advanced transport vehicles, especially the development of high-speed trains, it becomes more challenging to provide reliable services for UEs in high-speed movement with efficient utilization of valuable frequency resources.

Taking a high speed train scenario as an example, it has some unique characteristics. For example, the UEs on a high speed train (which will be referred to as HST UEs) move as one group with a high speed, and penetration loss to the train is very high, and thus path loss from the base station to the HST UEs is also high. Normally, if conventional cells along the rail track are re-used to provide coverage for the HST UEs, it is very hard to optimize the coverage and resource/interference management for both the HST UEs and non-HST UEs, which may located close to the rail track but are static or moving more slowly than the HST UEs.

Besides, most operators allocate a higher frequency spectrum for LTE compared with Global System for Mobile Communication (GSM). Therefore, the coverage problem becomes more serious since the path loss and penetration loss are much higher at higher frequency points than lower frequency points.

There are two main solutions for providing coverage for HST UEs, as illustrated in FIG. 1, where each base station is configured with two carriers f1 and f2. FIG. 1(a) illustrates a first solution that may be called a "common" solution, where carriers f1 and f2 are common for HST and non-HST UEs. It also means that when a HST is passing a cell, the non-HST UEs and HST UEs in the cell are sharing the radio resources on carriers f1 and f2, and the base station won't treat them differently with regard to scheduling and/or radio resource management (RRM).

FIG. 1(b) illustrates a second solution that may be called a "dedicated" solution, where carrier f1 is always used for non-HST UEs while carrier f2 is reserved for HST UEs only, no matter whether the HST UEs are present or not.

The common solution as illustrated in FIG. 1(a) cannot achieve good load management as HST UEs are group handed over from a cell to another in a quick speed. The instantaneous load may be very high when taking non-HST UEs into account and therefore UE experience may be deteriorated. In addition, the HST UEs may be subjected to interference from transmissions of neighboring non-HST UEs as both carriers f1 and f2 are simultaneously used by the non-HST UEs. This interference may be very serious mainly because the HST UEs experience much more path loss and no efficient intra-frequency interference handling mechanism is applied. Therefore, the quality of service (QoS) for the HST UEs may not be guaranteed.

The dedicated solution as illustrated in FIG. 1(b) may provide a good QoS to HST UEs without any interference from transmissions of neighboring non-HST UEs because of dedicate use of carrier f2. However, this good QoS is achieved at the cost of low spectrum utilization since the HST service in a cell is limited to a very short time period only when the HST is passing the cell. Therefore, the spectrum cannot be flexibly and efficiently utilized, which causes this solution costly.

In the "dedicated" solution, such a dedicated carrier may be based on a same site/antenna or different sites/antennas, where the latter case will have separate antennas and possibly sites. The dedicated solution with separate sites/antennas may provide optimized and flexible HST coverage more accurately, but this may also increase infrastructure investment and network management/optimization cost, like Physical layer Cell Identity (PCI) handling, and antenna tilting. Sometimes, if a paging channel (PCH) is not optimized between HST cells and non-HST cells, it may cause interference and degrade network performance due to a common reference signal (CRS) collision.

Therefore, the existing solutions are very hard to balance between QoS/interference management and spectrum/cost-efficient HST coverage.

SUMMARY

Various embodiments of the disclosure aim at addressing at least part of the above problems and disadvantages. Other features and advantages of embodiments of the disclosure will also be understood from the following description of specific embodiments when read in conjunction with the accompanying drawings, which illustrate, by way of example, the principles of embodiments of the disclosure.

In a first aspect of the present disclosure, a method in a base station for coordinating resources in a wireless communications system with carrier aggregation is proposed. In the wireless communications system, a first group of terminal devices is served by a primary cell and one or more secondary cells under control of the base station. The method comprises obtaining information indicating arrival of a second group of terminal devices at coverage of the base station. A speed of any terminal device of the second group is higher than a speed of any terminal device of the first group. The method also comprises releasing resources on at least one secondary cell of the one or more secondary cells and then allocating the released resources to the second group of terminal devices.

In some embodiments, the method may further comprise informing one or more neighboring base stations of the arrival of the second group of terminal devices to at least cause the neighboring base stations to suspend transmission on a carrier corresponding to the at least one secondary cell.

In other embodiments, the method may further comprise allocating the released resources back to the first group of terminal devices if the second group of terminal devices leaves the coverage of the base station.

In further embodiments, said obtaining information indicating arrival of a second group of terminal devices may be achieved by detecting, at the base station, the arrival of the second group of terminal devices or receiving a message of the arrival of the second group of terminal devices from a neighboring base station that obtains the information indicating the arrival of the second group of terminal devices at coverage of the neighboring base station.

In further embodiments, before receiving the message of the arrival of the second group of terminal devices from the neighboring base station, the method may further comprise triggering the neighboring base station to report the arrival of the second group of terminal devices.

In further embodiments, said releasing resources on at least one secondary cell may comprise any of the following: scheduling no resource on the at least one secondary cell for the first group of terminal devices; deactivating the at least one secondary cell for the first group of terminal devices; and de-configuring the at least one secondary cell for the first group of terminal devices.

In further embodiments, said resources may comprise a frequency resource.

In a second aspect of the present disclosure, a base station adapted for coordinating resources in a wireless communications system with carrier aggregation is provided. In the wireless communications system, a first group of terminal devices is served by a primary cell and one or more secondary cells under control of the base station. The base station comprises an obtaining module that is configured to obtain information indicating arrival of a second group of terminal devices at coverage of the base station. A speed of any terminal device of the second group is higher than a speed of any terminal device of the first group. The base station also comprises a releasing module that is configured to release resources on at least one secondary cell of the one or more secondary cells and an allocating module that is configured to allocate the released resources to the second group of terminal devices.

In some embodiments, the base station may further comprise an informing module that is configured to inform one or more neighboring base stations of the arrival of the second group of terminal devices to at least cause the neighboring base stations to suspend transmission on a carrier corresponding to the at least one secondary cell.

In other embodiments, the allocating module may be further configured to allocate the released resources back to the first group of terminal devices if the second group of terminal devices leaves the coverage of the base station.

In further embodiments, the obtaining module may be configured to obtain the information indicating the arrival of the second group of terminal devices by: detecting the arrival of the second group of terminal devices; or receiving a message of the arrival of the second group of terminal devices from a neighboring base station that obtains the information indicating the arrival of the second group of terminal devices at coverage of the neighboring base station.

In further embodiments, the base station may further comprise a triggering module that is configured to trigger the neighboring base station to report the arrival of the second group of terminal devices.

In further embodiments, the releasing module may be configured to release the resources on the at least one secondary cell by any of the following: scheduling no resource on the at least one secondary cell for the first group of terminal devices, deactivating the at least one secondary cell for the first group of terminal devices; and de-configuring the at least one secondary cell for the first group of terminal devices.

In a third aspect of the present disclosure, a base station adapted for coordinating resources in a wireless communications system with carrier aggregation is provided. In the wireless communications system, a first group of terminal devices is served by a primary cell and one or more secondary cells under control of the base station. The base station comprises a processor and a memory. The memory contains instructions executable by said processor, whereby the base station is operative to obtain information indicating arrival of a second group of terminal devices at coverage of the base station, wherein a speed of any terminal device of the second group is higher than a speed of any terminal device of the first group; release resources on at least one secondary cell of the one or more secondary cells; and allocate the released resources to the second group of terminal devices.

In a fourth aspect of the present disclosure, a base station adapted for coordinating resources in a wireless communications system with carrier aggregation is provided. In the wireless communications system, a first group of terminal devices is served by a primary cell and one or more secondary cells under control of the base station. The base station comprises processing means. The processing means is adapted to obtain information indicating arrival of a second group of terminal devices at coverage of the base station. A speed of any terminal device of the second group is higher than a speed of any terminal device of the first group. The processing means is also adapted to release resources on at least one secondary cell of the one or more secondary cells and allocate the released resources dedicated to the second group of terminal devices.

In a fifth aspect of the present disclosure, a computer program is provided. The computer program comprises instructions which, when executed on at least one processor, cause the at least one processor to carry out the method according to the first aspect of the present disclosure.

It should be appreciated that, corresponding embodiments of the first aspect are also applicable for the second aspect, the third aspect, the fourth aspect, and the fifth aspect.

With particular embodiments of the techniques described in this specification, by coordinating resources on secondary cells between low-speed terminal devices and high-speed terminal devices in a wireless communications system with carrier aggregation, QoS of the high-speed terminal devices may be guaranteed and the spectrum utilization may also be improved.

Other features and advantages of the embodiments of the present disclosure will also be understood from the following description of specific embodiments.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
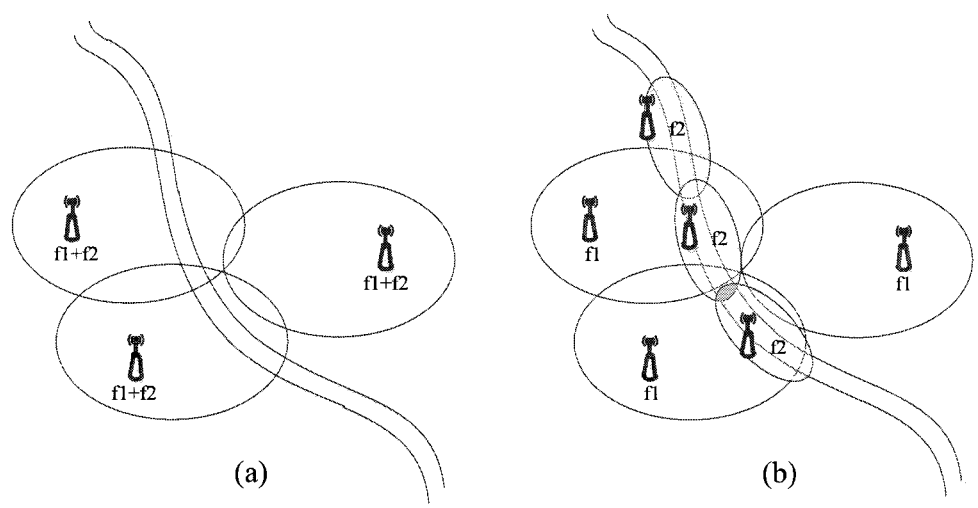
FIG. 1 illustrates two existing solutions for providing coverage for high speed train UEs in the prior art.

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of one skilled in the art to effect such feature, structure, or characteristic in connection with other embodiments whether or not explicitly described.

It shall be understood that, although the terms 'first' and 'second' etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skill in the art to which this disclosure belongs. For example, the term "base station" (BS), used herein may be referred to as e.g. eNB, eNodeB, NodeB or base transceiver station (BTS) etc. depending on the technology and terminology used, which may configure/de-configure and activate/de-activate secondary cells and schedule resources on the secondary cells, for example. Likewise, the term "terminal device" or UE used herein may refer to any terminal having wireless communication capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communication capabilities, or Internet appliances permitting wireless Internet access and browsing and the like. In the following description, the terms "user equipment" or "UE" and "terminal device" may be used interchangeably and the terms "base station" or "BS" and "eNodeB" or "eNB" may be used interchangeably hereinafter.

For illustrative purposes, several embodiments of the present disclosure will be described in the HST scenario. Those skilled in the art will appreciate, however, that several embodiments of the present disclosure may be more generally applicable to other high-speed UE involved scenarios. It should also be appreciated that, the terms "high speed" and "low speed" used herein are relative. In different environments, different speeds may be considered a high speed or low speed. Briefly, a speed higher than a first threshold may be considered a high speed, and a speed lower than a second threshold may be considered a low speed. The first and second thresholds may be the same or different. For example, in the HST scenario, the speed more than 250 km/h may be considered as a high speed and the speed lower than 160 km/h may be considered as a low speed. Obviously, the scope of the present disclosure is not limited how the terms "high speed" and "low speed" are defined.

While embodiments of the present disclosure are described herein in the context of a LTE network with carrier aggregation for illustrative purposes, those skilled in the art shall appreciate that the embodiments disclosed herein may also be applied to various other types of networks using more than one carrier.

Figure 2:
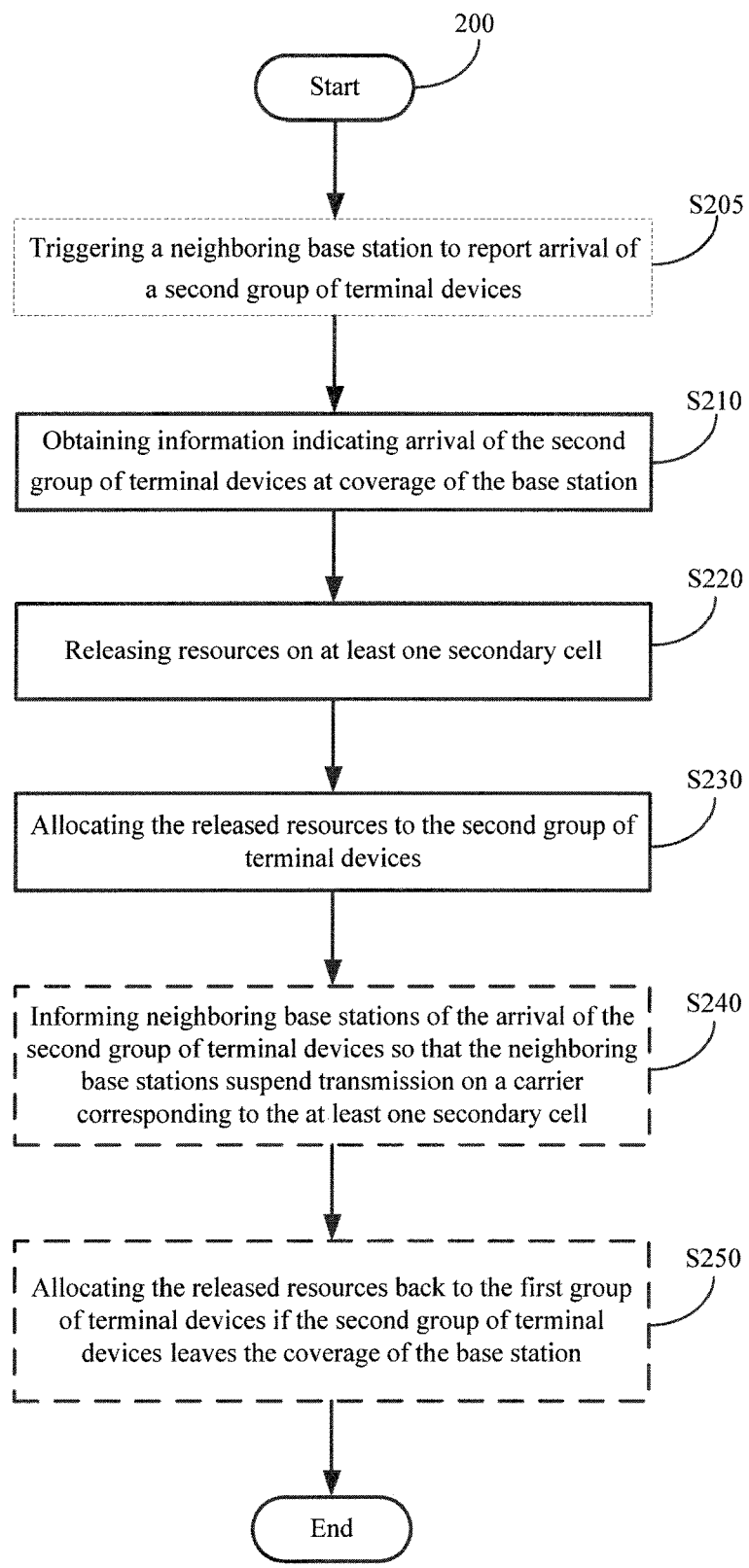
FIG. 2 illustrates an exemplary flowchart of a method for coordinating resources in a wireless communications system with carrier aggregation according to an embodiment of the present disclosure.

FIG. 2 illustrates an exemplary flowchart of a method 200 for coordinating resources in a wireless communications system with carrier aggregation according to an embodiment of the present disclosure. The method is implemented in a base station of the wireless communications system, in which a first group of terminal devices is served by a primary cell and one or more secondary cells that are under control of the base station.

As illustrated in FIG. 2, at block S210, information indicating arrival of a second group of terminal devices at coverage of the base station is obtained. A speed of any terminal device of the second group is higher than a speed of any terminal device of the first group. The first group may be referred to as a low-speed group and the terminal devices comprised therein may be referred to as low-speed terminal devices. Likewise, the second group may be referred to as a high-speed group and the terminal devices comprised therein may be referred to as high-speed terminal devices. The coverage of the base station may physically at least comprise the primary cell and the one or more secondary cells.

In one embodiment, the base station may obtain the information indicating the arrival of the second group of terminal devices by locally detecting the arrival of the high-speed terminal devices. For example, Reference 1 with international application NO. PCT/CN2013/087917 discloses a method for detecting high-speed terminal devices, which is already known to those skilled in the art and thus will not be detailed herein for the sake of conciseness.

In another embodiment, it is possible for the base station to obtain information on the arrival of the high-speed group from a neighboring base station that has already obtained the information indicating the arrival of the second group of terminal devices at its own coverage. Especially for the HST scenario, due to the continuous character of a rail track, the HST may move from a cell to a neighboring cell sequentially along the rail track. Therefore, such information may be signaled in a sequential way among the base stations deployed along the rail track.

Figure 3:
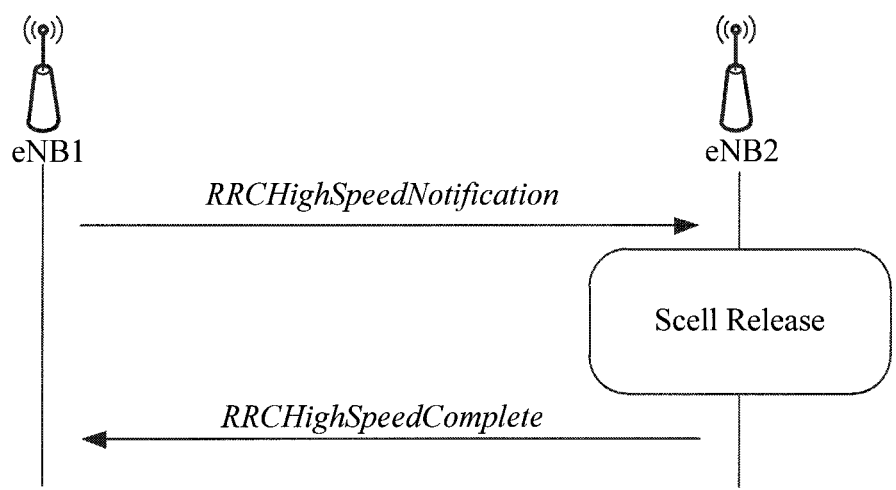
FIG. 3 illustrates an example for signaling a message of arrival of a high-speed group via a single message procedure between two neighboring eNBs, according to an embodiment of the present disclosure.

FIG. 3 illustrates an example for signaling the message of the arrival of the high-speed group via a single message procedure between two neighboring eNBs, according to an embodiment of the present disclosure. In this example, assuming that the train will pass eNB1 first (which may be referred to as a "upstream eNB") and subsequently pass eNB2 (which may be referred to as a "downstrem eNB"), then eNB1 that may have locally detected the arrival of the high-speed group of terminal devices or have obtained the information on the arrival from its own upstream neighboring eNB may notify eNB2 that the high-speed group of terminal devices arrives at the coverage of eNB1 via high layer signaling, e.g. RRC signaling, over an inter-node interface, such as the X2 interface. The RRC signaling may be existing or new, e.g. RRCHighSpeedNotification as illustrated in FIG. 3. This signaling may function prior to a handover procedure or it may be embedded in the signaling for the handover procedure. Additionally, once the downstream eNB2 receives the notification and accordingly performs operations as described later, e.g. secondary cell releasing, it may notify back to the upstream eNB1 that corresponding operations are completed, e.g. via a RRCHighSpeedComplete message as illustrated.

In another embodiment, before the information indicating the high speed group arrival is received by the base station, it may trigger at block S205 its neighboring base station that is located upstream and may have obtained information indicating the high speed group arrival at its own coverage to report the high speed group arrival. This mechanism may be called a trigger-report mechanism. An advantage to enable such a mechanism is to provide a control over the level of signaling indications and manage signaling overhead. Another advantage is to have a control of the signaling frequency, which may be for example periodic with a selected period or simply event triggered, i.e. a-periodic, e.g. when approaching of a high speed train is detected. Additionally, the trigger-report mechanism may be easily adapted to manage situations of cell overload, which may be realized by further signaling a message requesting a stop of the high speed group arrival report. A cause value or an equivalent information element (IE) value may indicate a reason for the request of the stop, which may be caused by a high cell load, for example.

Figure 4:
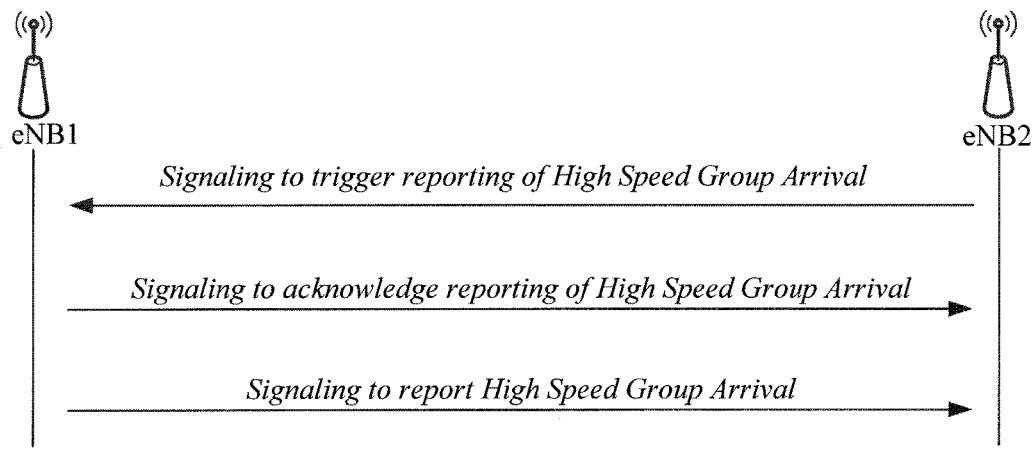
FIG. 4 illustrates an exemplary signaling flow for indicating arrival of a high-speed group of terminal devices based on a trigger-report mechanism over the X2 interface.

FIG. 4 illustrates an exemplary signaling flow for indicating the arrival of the high-speed group of terminal devices based on the trigger-report mechanism over the X2 interface. As illustrated, the downstream eNB2 firstly signals to trigger the upstream eNB1 to report the high speed group arrival. Then the upstream eNB1 replies to acknowledge the reporting of the high speed group arrival. Subsequently, the upstream eNB1 may report the high speed group arrival to the downstream eNB2 when it actually happens.

Figure 5:
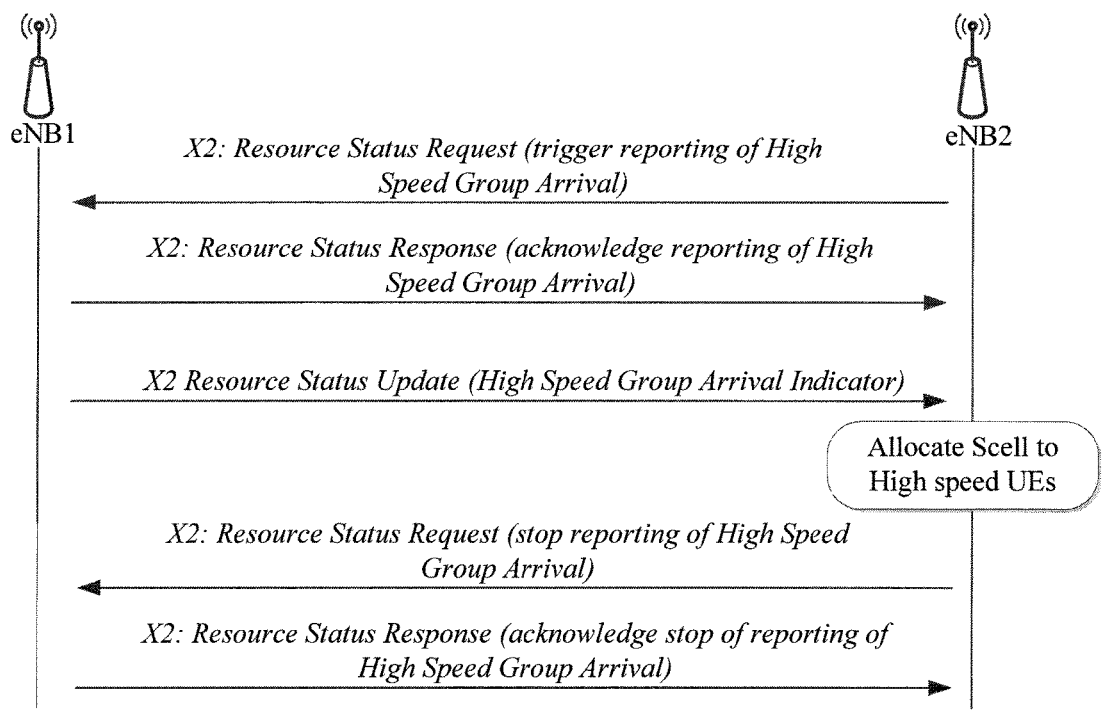
FIG. 5 illustrates another exemplary signaling flow for indicating arrival of the high-speed group of terminal devices based on the trigger-report mechanism via an existing Request/Response procedure over the X2 interface.

FIG. 5 illustrates another exemplary signaling flow for indicating the arrival of the second group of terminal devices based on the trigger-report mechanism via an existing Request/Response procedure over the X2 interface. The existing procedures that may be reused for such an indication may be an X2 Load Indication or Resource Status Request/Response/Update messages. As illustrated, the downstream eNB2 may firstly trigger periodic or aperiodic reporting of the high-speed group arrival via a Resource Status Request message over the X2 interface, and subsequently the upstream eNB1 may acknowledge the reporting of the high-speed group arrival in a Resource Status Response message. Subsequently, eNB1 may indicate the high-speed group arrival in a Resource Status Update message when the high-speed group actually arrives. Once the downstream eNB2 receives this indication, it will carry out operations as described in relation to blocks 220-240 in the following. Afterwards, the downstream eNB2 may additionally and preferably request the upstream eNB1 to stop reporting the high-speed group arrival in a Resource Status Request message and likewise, the upstream eNB1 may acknowledge the stop of reporting of the high-speed group arrival in a Resource Status Response message. Usually, the signaling for the stop of reporting happens in a case that the reporting is event triggered.

Now, the flow of method 200 may proceed to block S220. In response to receiving the information indicating the arrival of the second (i.e. high-speed) group of terminal devices at the coverage of the base station, resources on at least one secondary cell of the one or more secondary cells are released at block S220 by the base station.

As mentioned in the Background, before a terminal device supporting carrier aggregation can use Scells, it shall be firstly configured with the Scells, and the configured Scells shall be activated and then may be scheduled for use. Accordingly, reverse operations to the configuration, activation and scheduling may constitute three different approaches for releasing the resources on the SCells.

For example, the resources on the SCells may be released by not scheduling any resource on the SCells for the low-speed group of terminal devices. Since this approach may be implemented on the physical layer without involving high layer signaling, it may complete resource releasing very fast, usually within 1 millisecond (ms).

For another example, the resources on the Scells may be released by deactivating the Scells for the low-speed group of terminal devices. As introduced in the Background, the deactivation may be implemented by a MAC control element. For example, the MAC control element may carry a bitmap for the deactivation of Scells in which a bit set to 1 denotes activation of the corresponding Scell while a bit set to 0 denotes deactivation. With the bitmap, Scells can be activated and deactivated individually, and a single activation/deactivation command can activate/deactivate a subset of the SCells. The deactivation approach usually takes a time in an order of 10 ms for resource releasing.

For yet another example, the resources on the SCells may be released by de-configuring the SCells for the low-speed group of terminal devices. The de-configuration may be performed through existing RRC signaling, e.g. RRCConnectionReconfiguration. The de-configuration approach usually takes a time in an order of 100 ms for resource releasing.

Now, the flow of method 200 proceeds to block S230. Once the resources on the at least one SCell are released, the released resources are allocated to the second group of terminal devices at block S230. In particular, these released resources are dedicatedly used for the second group of terminal devices. The allocating operation may comprise configuring the at least SCell for the second group of terminal devices and activating them and then scheduling the resources on the at least SCell for transmission of the second group of terminal devices. The allocating operation is well known in the art, the description of which thus will be omitted herein for the sake of conciseness.

Preferably, in order to avoid or alleviate intra-frequency interference from neighboring cells, the base station may inform at block S240 one or more of its neighboring base stations of the arrival of the second group of terminal devices so that the one ore more neighboring base stations may suspend transmission on a carrier corresponding to the at least one secondary cell in their own coverage.

Additionally, if the high-speed group of terminal devices leaves the coverage of the base station, the base station may allocate the released resources back to the low-speed group of terminal devices at block S250 of method 200 as illustrated in FIG. 2.

According to the above embodiments of the present disclosure, there is proposed a dynamic, fast, cost-and-spectrum efficient method to secure QoS via good interference management between high-speed and low-speed terminal devices.

Figure 6:
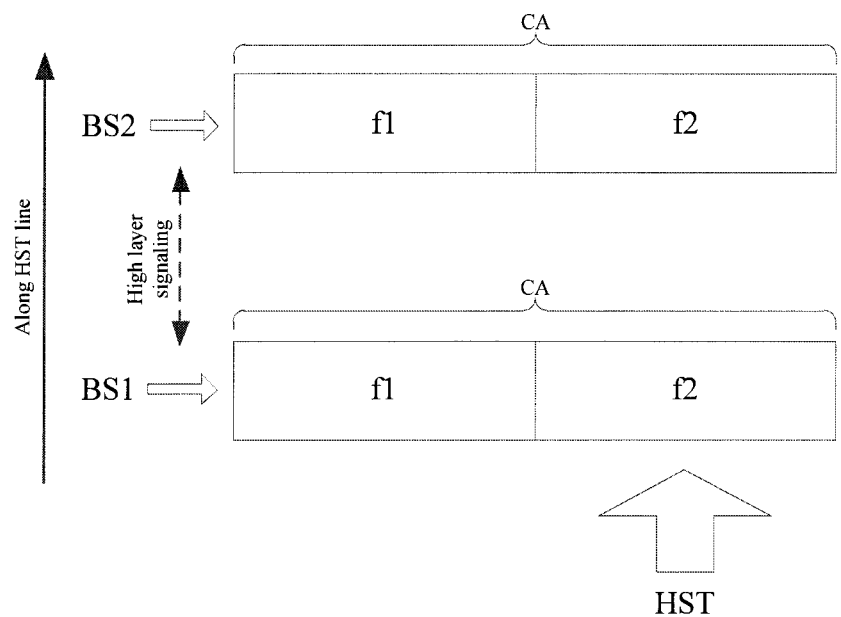
FIG. 6 explains advantages of the proposed method in an exemplary network wherein each base station is configured with two carriers f1 and f2.

The benefits and advantages of the proposed method 200 will be visually explained in an exemplary network wherein each base station is configured with two carriers f1 and f2 as illustrated in FIG. 6. In this example, it is assumed that carrier f1 is configured as the PCell and carrier f2 is configured as the SCell. Those skilled in the art shall appreciate that more carriers may be used in practical applications.

As illustrated in FIG. 6, both carriers may serve low-speed terminal devices when no HST arrives at the coverage of base station BS1. All low-speed terminal devices are registered in the PCell. Upon the HST arrives, carrier f2 as the SCell will be "released" for dedicate use by high-speed terminal devices on the HST. Therefore, service switching between low-speed terminal devices and high-speed devices is totally depending on the arrival of the HST and thus may be implemented dynamically. Furthermore, the speed for the SCell releasing is very fast as discussed above. Thus the service switching may be realized in real time.

Unlike dedicated solution in FIG. 1(*b*), both carriers f1 and f2 as illustrated in FIG. 6 may be flexibly allocated for low-speed or high-speed terminal devices by appropriately using signaling over the X2 interface, for example. Therefore, such a method 200 needs no additional investment on separate sites/antennas while achieving high spectrum utilization.

Furthermore, when the HST arrives at the coverage of BS1 as illustrated in FIG. 6, transmissions on carrier f2 of neighboring base stations, e.g. BS2 are all suspended. Therefore, intra-frequency interference from neighboring cells is under a good control. Accordingly, QoS for the high-speed terminal devices on the HST is ensured.

Figure 7:
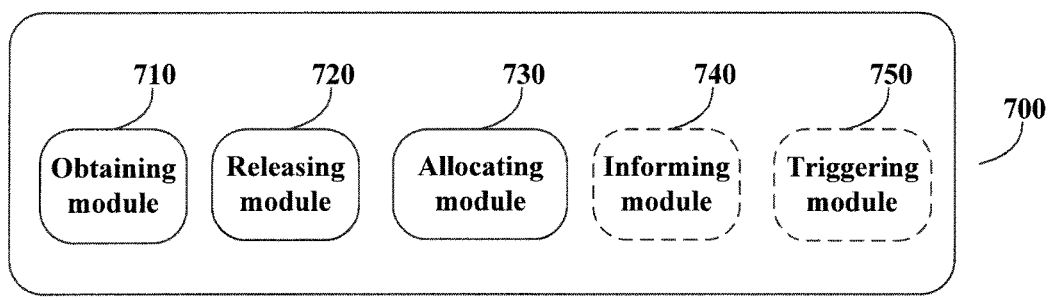
FIG. 7 illustrates a schematic block diagram of a base station that may be configured to practice exemplary embodiments of the present disclosure.

FIG. 7 illustrates a schematic block diagram of a base station 700 that may be configured to practice the exemplary embodiments herein. The base station 700 is adapted to coordinate resources in a wireless communications system with carrier aggregation in which a first group of terminal devices is served by a primary cell and one or more secondary cells under the control of the base station 700.

As illustrated in FIG. 7, the base station 700 comprises an obtaining module 710, a releasing module 720, and an allocating module 730.

The obtaining module 710 is configured to obtain information indicating arrival of a second group of terminal devices at coverage of the base station 700. A speed of any terminal device of the second group is higher than a speed of any terminal device of the first group and the coverage may at least comprise the primary cell and the one or more secondary cells.

In some embodiments, the obtaining module 710 may be configured to obtain the information indicating the arrival of the second group of terminal devices by locally detecting the arrival of the second group of terminal devices or receiving a message of the arrival of the second group of terminal devices from a neighboring base station that obtains the information indicating the arrival of the second group of terminal devices at coverage of the neighboring base station. The operations of the obtaining module 710 correspond to those described above in relation to block S210 of FIG. 2 and thus the detailed description thereof will be omitted herein for the sake of conciseness.

The releasing module 720 is configured to release resources on at least one secondary cell of the one or more secondary cells.

In some embodiment, the releasing module 720 may be configured to release the resources on the at least one secondary cell by scheduling no resource on the at least one secondary cell for the first group of terminal devices, deactivating the at least one secondary cell for the first group of terminal devices, and de-configuring the at least one secondary cell for the first group of terminal devices. The operations of the releasing module 720 correspond to those described above in relation to block S220 of FIG. 2 and thus the detailed description thereof will be omitted herein for the sake of conciseness.

The allocating module 730 is configured to allocate the released resources to the second group of terminal devices.

In some embodiments, the allocating module 730 may be further configured to allocate the released resources back to the first group of terminal devices if the second group of terminal devices leaves the coverage of the base station 700.

As illustrated in FIG. 7, the base station 700 may further comprise an informing module 740. The informing module 740 may be configured to inform one or more neighboring base stations of the arrival of the second group of terminal devices to at least cause the neighboring base stations to suspend transmission on a carrier corresponding to the at least one secondary cell. The operations of the releasing module 740 correspond to those described above in relation to block S240 of FIG. 2 and thus the detailed description thereof will be omitted herein for the sake of conciseness.

As illustrated in FIG. 7, the base station 700 may further comprise a triggering module 750. The triggering module 750 may be configured to trigger the neighboring base station to report the arrival of the second group of terminal devices. The operations of the releasing module 750 correspond to those described above in relation to block S205 of FIG. 2 and thus the detailed description thereof will be omitted herein for the sake of conciseness.

Figure 8:
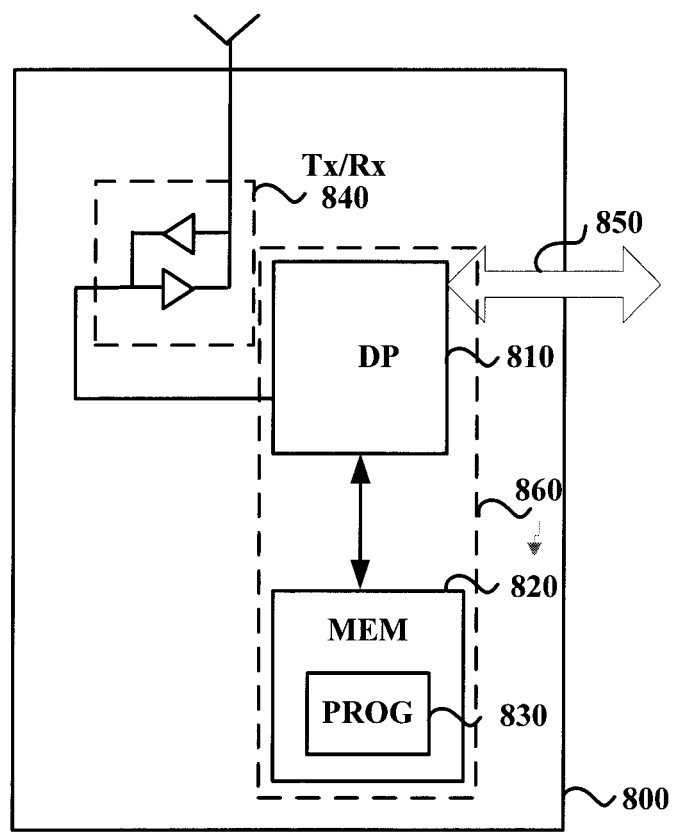
FIG. 8 illustrates a simplified block diagram of an apparatus that is suitable for use in practicing exemplary embodiments of the present disclosure.

FIG. 8 illustrates a simplified block diagram of an apparatus 800 that is suitable for use in practicing exemplary embodiments of the present disclosure. The apparatus 800 may be embodied in or as a base station.

As shown in FIG. 8, the apparatus 800 includes a data processor (DP) 810, a memory (MEM) 820 coupled to the DP 810, a suitable RF transmitter TX and receiver RX 840 coupled to the DP 810, and a communication interface 850 coupled to the DP 810. The MEM 820 stores a program (PROG) 830. The TX/RX 840 is for bidirectional wireless communications. Note that the TX/RX 840 has at least one antenna to facilitate communication, though in practice a BS may have several ones. The communication interface 850 may represent any interface that is necessary for communication with other network elements, such as X2 interface for bidirectional communications between eNBs, S1 interface for communication between a Mobility Management Entity (MME)/Serving Gateway (S-GW) and the eNB, or Un interface for communication between the eNB and a relay node (RN). The apparatus 800 may be coupled via a data path to one or more external networks or systems, such as the internet, for example.

The PROG 830 is assumed to include program instructions that, when executed by the associated DP 810, enable the apparatus 800 to operate in accordance with the exemplary embodiments of this disclosure, as discussed herein with the method in FIG. 2. For example, the PROG 830 and the DP 810 may embody the releasing module 720 and the allocating module 730 to perform the respective operations. The TX/RX 840 and the communication interface 850 may embody the obtaining module 710 and optional the informing module 740 and the triggering module 750 to perform the respective operations.

The embodiments herein may be implemented by computer software executable by the DP 810 of the apparatus 800, or by hardware, or by a combination of software and hardware.

A combination of the data processor 810 and MEM 820 may form processing means 860 adapted to implement various embodiments of the present disclosure.

The MEM 820 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 800, there may be several physically distinct memory units in the apparatus 800. The DP 810 may be of any type suitable to the local technical environment, and may include one or more of general purpose computers, special purpose computers, microprocessors, digital signal processors (DSPs) and processors based on multicore processor architecture, as non limiting examples. The apparatus 800 may have multiple processors, such as for example an application specific integrated circuit chip that is slaved in time to a clock which synchronizes the main processor.

Exemplary embodiments herein have been described above with reference to block diagrams and flowchart illustrations of methods, apparatuses (i.e., systems). It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create processing means for implementing the functions specified in the flowchart block or blocks.

The foregoing computer program instructions can be, for example, sub-routines and/or functions. A computer program product in one embodiment comprises at least one computer readable storage medium, on which the foregoing computer program instructions are stored. The computer readable storage medium can be, for example, an optical compact disk or an electronic memory device like a RAM (random access memory) or a ROM (read only memory).

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It should also be appreciated that the above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. A method in a base station for coordinating resources in a wireless communications system with carrier aggregation, the method comprising:
    serving, by the base station, a first group of terminal devices using at least one resource associated with a primary cell and at least one resource associated with a secondary cell;
    obtaining information indicating arrival of a second group of terminal devices at coverage of the base station;
    determining that a speed of any terminal device of the second group of terminal devices is higher than a speed of any terminal device of the first group of the terminal devices;
    in response to determining that the speed of any terminal device of the second group of terminal devices is higher than the speed of any terminal device of the first group of terminal devices, releasing resources on at least one secondary cell of the one or more secondary cells; and
    allocating the released resources to the second group of terminal devices.

2. The method according to claim 1, further comprising:
    informing one or more neighboring base stations of the arrival of the second group of terminal devices to at least cause the neighboring base stations to suspend transmission on a carrier corresponding to the at least one secondary cell.

3. The method according to claim 1, further comprising:
    allocating the released resources back to the first group of terminal devices if the second group of terminal devices leaves the coverage of the base station.

4. The method according to claim 1, said releasing resources on at least one secondary cell comprising any of the following:
    scheduling no resource on the at least one secondary cell for the first group of terminal devices;
    deactivating the at least one secondary cell for the first group of terminal devices; and
    de-configuring the at least one secondary cell for the first group of terminal devices.

5. The method according to claim 2, said releasing resources on at least one secondary cell comprising any of the following:
    scheduling no resource on the at least one secondary cell for the first group of terminal devices;
    deactivating the at least one secondary cell for the first group of terminal devices; and
    de-configuring the at least one secondary cell for the first group of terminal devices.

6. The method according to claim 1, wherein said resources comprise frequency resource.

7. A base station adapted for coordinating resources in a wireless communications system with carrier aggregation in which a first group of terminal devices is served by a primary cell and one or more secondary cells under control of the base station, the base station comprising:
    a processor; and a memory, said memory containing instructions executable by said processor, whereby said base station is operative to:
    serve a first group of terminal devices using at least one resource associated with a primary cell and at least one resource associated with a secondary cell;
    obtain information indicating arrival of a second group of terminal devices at coverage of the base station;
    determining that a speed of any terminal device of the second group of terminal devices is higher than a speed of any terminal device of the first group of terminal devices;
    in response to determining that the speed of any terminal device of the second group of terminal devices is higher than the speed of any terminal device of the first group of terminal devices, release resources on at least one secondary cell of the one or more secondary cells; and
    allocate the released resources to the second group of terminal devices.

8. The base station according to claim 7, wherein the base station is further operative to:
    inform one or more neighboring base stations of the arrival of the second group of terminal devices to at least cause the neighboring base stations to suspend transmission on a carrier corresponding to the at least one secondary cell.

9. The base station according to claim 7, wherein the base station is further operative to:
    allocate the released resources back to the first group of terminal devices if the second group of terminal devices leaves the coverage of the base station.

10. The base station according to claim 7, wherein the base station is operative to release resources on at least one secondary cell by any of the following:
    scheduling no resource on the at least one secondary cell for the first group of terminal devices;
    deactivating the at least one secondary cell for the first group of terminal devices; and
    de-configuring the at least one secondary cell for the first group of terminal devices.

11. The base station according to claim 8, wherein the base station is operative to release resources on at least one secondary cell by any of the following:
    scheduling no resource on the at least one secondary cell for the first group of terminal devices;
    deactivating the at least one secondary cell for the first group of terminal devices; and
    de-configuring the at least one secondary cell for the first group of terminal devices.

12. The base station according to claim 7, wherein said resources comprise frequency resource.

13. A base station adapted for coordinating resources in a wireless communications system with carrier aggregation in which a first group of terminal devices is served by a primary cell and one or more secondary cells under control of the base station, the base station comprising processing means adapted to:

serve a first group of terminal devices using at least one resource associated with a primary cell and at least one resource associated with a secondary cell;

obtain information indicating arrival of a second group of terminal devices at coverage of the base station;

determine that a speed of any terminal device of the second group of terminal devices is higher than a speed of any terminal device of the first group of terminal devices;

in response to determining that the speed of any terminal device of the second group of terminal devices is higher than the speed of any terminal device of the first group of terminal devices, release resources on at least one secondary cell of the one or more secondary cells; and allocate the released resources to the second group of terminal devices.

14. The base station according to claim 13, wherein the processing means is further adapted to: inform one or more neighboring base stations of the arrival of the second group of terminal devices to at least cause the neighboring base stations to suspend transmission on a carrier corresponding to the at least one secondary cell.

15. The base station according to claim 13, wherein the processing means is further adapted to: allocate the released resources back to the first group of terminal devices if the second group of terminal devices leaves the coverage of the base station.

* * * * *

UNITED STATES PATENT AND TRADEMARK OFFICE
CERTIFICATE OF CORRECTION

PATENT NO. : 10,536,243 B2
APPLICATION NO. : 15/503975
DATED : January 14, 2020
INVENTOR(S) : Hu et al.

It is certified that error appears in the above-identified patent and that said Letters Patent is hereby corrected as shown below:

In the Specification

In Column 10, Line 1, delete "ore" and insert -- or --, therefor.

In Column 11, Lines 34-35, delete "releasing module 740" and insert -- releasing module 720 --, therefor.

In Column 11, Line 42, delete "releasing module 750" and insert -- releasing module 720 --, therefor.

Signed and Sealed this
Twenty-first Day of July, 2020

Andrei Iancu
*Director of the United States Patent and Trademark Office*